3,833,652
Patented Sept. 3, 1974

3,833,652
PREPARATION OF TETRACHLOROTEREPH-THALOYL CHLORIDE FROM CHLORINATION OF TEREPHTHALOYL CHLORIDE OR TEREPHTHALIC ACID IN A SOLUTION OF CHLOROSULFONIC ACID
James O. Knobloch, Naperville, Ill., assignor to Standard Oil Company, Chicago, Ill.
No Drawing. Filed Dec. 29, 1972, Ser. No. 319,502
Int. Cl. C07c 63/30
U.S. Cl. 260—544 M          6 Claims

ABSTRACT OF THE DISCLOSURE

Tetrachloroterephthaloyl chloride is prepared from terephthaloyl chloride or terephthalic acid in a single step by chlorinating terephthaloyl chloride or terephthalic acid in solution in chlorosulfonic acid containing sulfur trioxide and employing an iodine catalyst. The reaction is carried out under mild conditions. The product, tetrachloroterephthaloyl chloride is recoverable by extraction with an inert solvent or by low temperature crystallization. Adhering chlorosulfonic acid is flashed from the recovered solid tetrachloroterephthaloyl chloride which is then sublimed or recrystallized. Chlorosulfonic acid is formed as a by-product of the chlorination reaction.

BACKGROUND OF INVENTION

The recent growth in the use of flammable materials has increased the incidences of damage and personal injury by fire. Concern for public safety has prompted government agencies to impose stricter flammability standards for those applications where synthetic materials are used. As a result, the use of halogen containing compounds as additives or as an integral part of a finished polymer to impart fire retardant properties to polymeric materials is a rapidly growing industry of great commercial importance. Such compositions can be utilized in those areas of application where fire is likely to occur and to prevent substantial danger or hazard to individuals or property. Examples of such applications are use of polymeric material in household appliances, building materials, the auto industry, the aircraft industry, and others. The seriousness of the potential danger from combustible materials has spurred activity on the part of various government regulatory bodies. Thus, several government agencies are setting flammability standards for autos, aircraft, carpets and other articles made from synthetic polymeric materials. In response to these pressures, makers of synthetic polymeric materials are increasing their efforts to impart flame retardant properties to their products.

An object of this invention is to provide an intermediate compound containing chlorine that may be used to form fire retardant polymeric products. Such products would include synthetic polyesters that may find use in a variety of applications where a high degree of flame retardancy or where self-extinguishing properties are desirable or necessary.

My invention relates to the preparation of tetrachloroterephthaloyl chloride, a valuable intermediate to be used to form flame retardant polymers, wherein terephthaloyl chloride or terephthalic acid is reacted with chlorosulfonic acid containing sulfur trioxide in the presence of an iodine catalyst.

Current methods for preparing tetrachlorinated intermediates, such as dimethyl tetrachloroterephthalate, requires a four step process wherein paraxylene is chlorinated to para-di(trichloromethyl) benzene. The para-di(trichloromethyl) benzene, is then reacted in equimolar quantities, with terephthalic acid, forming two moles of terephthaloyl chloride. The resulting terephthaloyl chloride is then chlorinated to tetrachloroterephthaloyl chloride by heating the terephthaloyl chloride neat, in the presence of an iron catalyst and introducing chlorine to the mixture. This process requires high temperatures, 175° C. or greater, provides a yield of tetrachloroterephthaloyl chloride of about 60 to 65%, and results in the formation of an excessive amount of hexachlorobenzene, an undesirable byproduct because it is difficult to separate from the tetrachloroterephthaloyl chloride. In addition, the aromatic ring chlorination requires excessive reaction time, a reported time being about 50 hours. Finally the tetrachloroterephthaloyl chloride is reached with methanol to form dimethyl tetrachloroterephthalate.

According to another method tetrachloroterephthalic acid is made by tetrachlorination of paraxylene on the ring and then oxidation of the resulting compound in a sealed tube in the presence of potassium permanganate and nitric acid to form tetrachloroterephthalic acid.

Another method, consisted of chlorinating terephthalic acid in oleum in the presence of an iodine catalyst. However, the reaction temperatures were extremely high, extending to 180° C. and the resulting tetrachloroterephthalic acid product was accompanied by much hexachlorobenzene and abundant quantities of partially chlorinated acid. Further chlorination of the partially chlorinated acid was made difficult due to the ease with which the terephthalic acids decarboxylate at these high temperatures with the formation of hexachlorobenzene.

In a German patent, No. 1,078,563, a process for the preparation of tetrachloroterephthalic acid is disclosed wherein terephthalic acid is chlorinated in oleum held at 40 to 80° C. and 7 atmospheres of pressure in the presence of an iodine catalyst. The process provides a yield of 70 mole percent tetrachloroterephthalic acid product.

In an earlier patent, U.S. Pat. 1,997,226, certain organic compounds dissolved in oleum were chlorinated by applying chlorine gas to the mixtures under pressure and allowing the reactants to react until the pressure is reduced to one atmosphere.

The use of oleum during the chlorination process, as disclosed in the German and U.S. patents, produces a chlorinated product in the form of a free acid or, in the case of phthalic anhydride, the easily formed anhydride. The product, tetrachloroterephthalic acid, is unreactive and therefore not a desirable product, under ordinary esterification conditions. The product produced from my novel process, tetrachloroterephthaloyl chloride, is however, a compound that is chemically reactive and therefore a more desirable chlorinated compounds than the free acid.

Tetrachloroterephthaloyl chloride has been produced by certain classical reactions. Thus for example, tetrachloroterephthalic acid may be reacted with phosphorous pentachloride to give a reasonable yield of tetrachloroterephthaloyl chloride. However, phosphorous pentachloride is a commercially expensive reagent and hence this method is not desirable.

Tetrachloroterephthaloyl chloride has been synthesized from terephthaloyl chloride by neat chlorination at elevated temperatures of 175° C. in the presence of an iron catalyst. The product contains from 10 to 20% hexachlorobenzene, an undesirable by-product because it is hard to remove from the diacid chloride. Also, where terephthaloyl chloride is used as the starting material, it must be obtained and purified by commercially expensive routes from terephthalic acid.

My novel process consists of the chlorination of terephthalic acid or terephthaloyl chloride in chlorosulfonic acid in the presence of an iodine catalyst. The reaction temperature is moderate, being in the range of 50 to 120° C. In addition the yields of tetrachloroterephthaloyl chloride is extremely high, yields as high as 81 mole percent having been realized. In addition, the tetrachloroterephthaloyl chloride produced is 97 to 99% pure and contains less than 1% hexachlorobenzene.

My novel process allows terephthalic acid to be used as the starting material directly, producing high yields of tetrachloroterephthaloyl chloride, containing low impurities, in a one step process, and forming little hexachlorobenzene, as an undesirable by-product.

SUMMARY OF INVENTION

My new process consists of chlorinating terephthalic acid or terephthaloyl chloride in a solution of chlorosulfonic acid containing sulfur trioxide, in the presence of an iodine catalyst, at moderate temperatures in the range of from about 50 to about 120° C., the preferred temperature range being from about 85 to about 95° C. The reaction proceeds rapidly producing a high yield of tetrachloroterephthaloyl chloride over a period of from 1 to 4 hours. Chlorine gas is passed through the solution of oleum held at atmospheric pressure, to produce the diacid chloride as well as additional chlorosulfonic acid, a valuable by-product.

According to my novel process, terephthaloyl chloride may be chlorinated to form tetrachloroterephthaloyl chloride. The reaction occurring can be represented by the following equation:

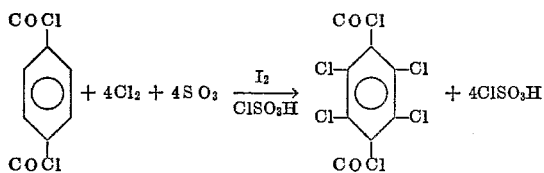

Alternatively, my novel invention provides that terephthalic acid may be chlorinated directly to tetrachloroterephthaloyl chloride. The reaction occurring according to this novel process may be represented by the following equation.

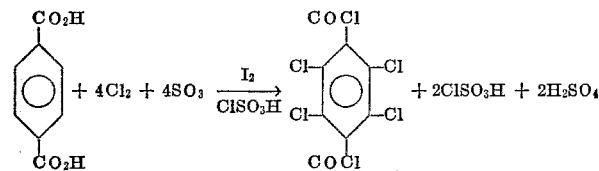

This process obviates the expensive isolation and purification of terephthaloyl chloride; the reaction proceeds to form directly the tetrachloroterephthaloyl chloride, in a single step process.

The product of my novel process tetrachloroterephthaloyl chloride, may be recovered from the reaction mixture by either solvent extraction or low temperature precipitation. Chlorosulfonic acid may then be distilled from the mother liquor. If the chlorosulfonic acid is distilled before removing the tetrachloroterephthaloyl chloride, unfavorable equilibria will reduce the tetrachloroterephthaloyl chloride yield by the formation of insoluble polymeric anhydride and free tetrachloroterephthalic acid. The tetrachloroterephthaloyl product may be isolated by flash distilling the solvent and any accompanying chlorosulfonic acid from the solvent extraction step, and then purifying this product by subliming or recrystallizing the residual tetrachloroterephthaloyl chloride.

The product obtained by my novel process melts in the temperature range of 144 to 146° C. (uncorrected). The literature shows that tetrachloroterephthaloyl chloride has a melting point of 147.5–148° C. This product may be further purified by recrystallization from a suitable solvent such as n-octane or carbon tetrachloride.

My novel process may be further illustrated by the following examples:

PREPARATION OF TETRACHLOROTEREPHTHALOYL CHLORIDE FROM CHLORINATION OF TEREPHTHALOYL CHLORIDE IN CHLOROSULFONIC ACID

Example 1

Chlorination without sulfur trioxide in solvent.—Apparatus consisting of a 1 liter, 4-neck creased flask equipped with a fritted glass gas sparger, a thermometer in the liquid phase, a stirrer, a condenser, and a heating mantle (the flask being shielded from the light with an aluminum foil cover) was mounted on a solution balance so that weight uptake could be monitored. Terephthaloyl chloride was freshly distilled into the reaction flask. The chlorosulfonic acid and iodine were then added. The charge was: Freshly distilled terephthaloyl chloride 77.6 g. (0.382 moles), chlorosulfonic acid 699.4 g. (6.00 moles), and resublimed iodine 1.007 g. Chlorine was passed into the light-shielded flask at 64° C., the temperature rose to 90° C. in ten minutes and was manitained in the 90–96½° C. range for 70 minutes longer. The weight of the solution increased approximately 30 grams over a period of 60 minutes. The reaction was much less vigorous than when free $SO_3$ was charged. Chlorination was stopped when the weight became constant. The solution was clear. Overnight the cooled solution deposited solids. These were filtered on an M porosity Büchner funnel in a dry box. The filter cake (hereinafter called Insoluble Product A) weighed 67.3 g. (acid wet). The filtrate (730.4 g.) was vacuum distilled to strip off excess chlorosulfonic acid (598.4 g.) at 5–7 mm. Hg and 60–74° C. distilling head temperature. The residue, a thick syrupy material, weighed 80.8 g. (hereinafter called Residue B).

Aliquots of insoluble Product A and Residue B were worked up by several routes. In each case the results are reported on the total run basis, as if all of each product had been handled by each method.

Insoluble Product A and Residue B were reacted with sodium methoxide in absolute methanol thereby converting tetrachloroterephthaloyl chloride to the dimethyl ester. On evaporating the methanol, suspending the alkaline residue in water, filtering and washing until the filtrate was neutral, the dimethyl esters were recovered. The dried esters had the weights and analyses as shown in Table I.

TABLE I

[Ester formed by reacting tetrachloroterephthaloyl chloride with sodium methoxide in absolute methanol]

| Source | Insoluble Product A | Residue B |
| --- | --- | --- |
| Weight | 31.0 | 38.6 |
| Melting point,° C | 156 | (¹) |
| Gas chromatographic analysis (wt. percent): | | |
| Dimethyl terephthalate | | 0.70 |
| Dimethyl chloroterephthalate | | 0.84 |
| Dimethyl dichloroterephthalate | 1.31 | 61.1 |
| Unknown | | 4.66 |
| Dimethyl trichloroterephthalate | 0.68 | 20.4 |
| Dimethyl tetrachloroterephthalate | 94.7 | 9.50 |
| Total | 96.7 | 97.2 |

¹ 85–110° C. (most) to 284° C. (small amount).

The analyses of Table I corresponds to the following mole percent yields based on terephthaloyl chloride charged to chlorination:

| | Insoluble Product A | Residue B |
| --- | --- | --- |
| Tetrachloroterephthaloyl chloride | 23.2 | 2.89 |
| Trichloroterphthaloyl chloride | 0.19 | 6.93 |
| Dichloroterephthaloyl chloride | 0.40 | 23.5 |
| Chloroterephthaloyl chloride | | 0.37 |
| Terephthaloyl chloride | | 0.36 |
| Total | 23.8 | 34.1 |

The yields are based on the assumption that the diacid chlorides were converted to dimethyl esters. Insoluble Product A was also worked up by vacuum distillation of residual chlorosulfonic acid and sublimation of the residue, under vacuum. Sublimate amounted to 35.2 g. The gas chromotographic analysis for tetrachloroterephthaloyl chloride symbolically denoted as (Cl4TACl) was 89.5 wt. percent. This corresponds to a 24.2 mole percent yield of tetrachloroterephthaloyl chloride in the original filter cake. This yield was confirmed by a gas chromatographic analysis of a carbon tetrachloride solution of Insoluble Product A.

In the next example (Example 2), the solvent used was chlorosulfonic acid. A 4.58 to 1 mole ratio of sulfur trioxide to terephthaloyl chloride was provided by adding liquid sulfur trioxide. Monitored weight uptake during chlorination showed 99% of the weight increase expected from theoretical calculations.

*Example 3* illustrates a realized yield of 45.6 mole percent of product is obtainable if all of the chlorosulfonic acid is distilled from the total chlorination effluent and the tetrachloroterephthaloyl chloride product is sublimed.

When the total chlorination effluent from Example 2 was extracted with carbon tetrachloride, and the extracts distilled under vacuum to remove the carbon tetrachloride and any residual chlorosulfonic acid, the product, after sublimation, represents a 79.5 mole percent yield of tetrachloroterephthaloyl chloride. This is illustrated in *Example 4*.

*Example 5* illustrates the same results where carbon disulfide is used as the extracting solvent. Here an 81.0 mole percent yield of tetrachloroterephthaloyl chloride is realized.

Example 2

Chlorination was SO₃ in solvent.—The apparatus of Example 1 was employed. The charge was 72.2 grams of (.356 moles) freshly distilled terephthaloyl chloride, 664.3 grams of chlorsulfonic acid, 130.7 grams of liquid sulfur trioxide (1.63 moles) and 1.005 grams of iodine. Chlorine was introduced at 35° C. Weight intake indicating chlorination began at about 75° C. The weight of the solution increased approximately 98 grams during a period of about 70 minutes. The temperature inside the flask was maintained in the 90–98° C. range by intermittent use of an ice bath. After 82 minutes of chlorination the reaction was stopped. The clear effluent (weighing 952.5 grams) was divided into four weight aliquots for separate study.

Example 3

A 217.0 gram aliquot of the chlorosulfonic acid solution from Example 2 was vacuum distilled using an 8 inch knockback tube and a vacuum jacketed distillation head. Under 2½–3 mm. Hg absolute pressure distillate was taken over (at a 54½–59½° C. head temperature) until the final bottoms temperature reached 81° C. Distillate of 145.6 grams was collected. Additional overhead product was collected in the vacuum trap but was not measured. The bottom product weighed 28.9 grams. An analysis of the bottoms product by gas chromatography employing an internal standard revealed it to consist of 41.6 wt. percent of tetrachloroterephthaloyl chloride and .416 wt. percent hexachlorobenzene. This is equivalent to a 43.4 mole percent yield of tetrachloroterephthaloyl chloride on a total run basis.

A 5.1 gram sample of the bottoms was sublimed using a Kontes 85550 Sublimator at less than 1 mm. Hg absolute pressure and an oil bath temperature of 130–236½° C. (Steam was passed through the sublimator's condenser until the bath temperature reached 130° C., to drive over any chlorosulfonic acid present in the charge; cooling water was then turned on in place of steam.) The cold receiver collected 0.4 grams. The sublimate amounted to 2.5 grams and the bottoms product was 2.0 grams. Gas chromatographic analysis of the bottoms product showed only trace amounts of hexachlorobenzene and tetrachloroterephthaloyl chloride. The subliminate consisted of 89.4 wt. percent tetrachloroterephthaloyl chloride and 1.53 wt. percent hexachlorobenzene. This is equivalent to a 45.6 mole percent yield of tetrachloroterephthaloyl chloride on a total run basis.

Example 4

A 223.4 gram aliquot of the chlorosulfonic acid solution from Example 2 was extracted successively with dry carbon tetrachloride in 500 ml. separatory funnels, first with 250 cc. of carbon tetrachloride and then followed by three successive extractions with 170 cc. of carbon tetrachloride each. The final solution of chlorosulfonic acid weighed 205.8 grams. The four extracts weighed: 241.3 grams, 254.1 grams, 314.2 grams and 300.7 grams respectively.

The chlorosulfonic acid solution was then stripped of the carbon tetrachloride in an oil bath held at 98 to 106° C. by distillation. The distillate held at 77° C. consisted of 63.9 grams of amber liquid.

The bottom was held at 95–106° C. (oil bath temp.) in an attempt to obtain equilibration. After cooling 132.6 grams of the remaining liquid solution was further extracted in two 500 ml. separatory funnels, first with 150 cc. of carbon tetrachloride and then with 110 cc. of carbon tetrachloride leaving behind 154.8 grams of chlorosulfonic acid. The first extract weighed 191.6 grams and the second extract weighed 200.7 grams.

All six extracts were analyzed by gas chromotography. The results are shown in Table II. The 20.30 grams of tetrachloroterephthaloyl chloride found in the extracts represented a 71.4 mole percent yield based on terephthaloyl chloride charged to the reaction. The tetrachloroterephthaloyl chloride was recovered from the extract by evaporation of the carbon tetrachloride solvent under vacuum.

The residual chlorosulfonic acid was removed by vacuum distillation and then the tetrachloroterephthaloyl chloride was purified by sublimation. The sublimate consisted of 22.62 grams of pure tetrachloroterephthaloyl chloride representing a 79.5 mole percent yield.

TABLE II
[Extraction of ClSO₃H solution with CCl4 and recovery of Cl4TACl]

| Extract number | Wt. of Cl4TACl in extract (grams) (g.c. anal.) | Pure Cl4TACl in sublimate (grams) |
|---|---|---|
| 1 | 10.27 | 11.6 |
| 2 | 5.63 | 6.24 |
| 3 | 3.07 | 3.35 |
| 4 | 1.04 | 1.12 |
| 5 | .21 | .23 |
| 6 | 0.77 | .08 |
| Total | 20.30 | 22.62 |

Example 5

A 278.9 gram aliquot of the chlorosulfonic acid solution from Example 2 was extracted successively with dry carbon disulfied in a 500 cc. separatory funnel. First 225 cc. of carbon disulfide then followed by three successive extractions with 200 cc. of carbon disulfide each. The final solution of chlorosulfonic acid weighed 255.0 grams. The four extracts weighed 256.0 grams, 263 grams, 258.5 grams and 252.4, grams, respectively.

The four extracts were hazy. Upon allowing them to stand overnight they became clear and a small yellow underlayer separated. A gas chromotograph analysis was performed on the clear upper layer. Both the upper layer and the smaller heavy under layer were combined and evaporated under vacuum to remove solvent. Extract and sublimate analyses are shown in Table III. The 22.7 grams of tetrachloroterephthaloyl chloride recovered in the extract represented a 63.8 mole percent yield of tetrachloroterephthaloyl chloride based on the terephthaloyl chloride charged to chlorination. The 28.8 grams of pure tetrachloroterephthaloyl chloride found in the sublimate represented an 81.0 mole percent yield on the same basis.

TABLE III

[Extraction of ClSO₃H solution with CS₂ and recovery of Cl₄TACl]

| Extract number | Wt. of Cl₄TACl in extract (grams) by g.c. analysis | Sublimate | | Wt. of Cl TACl (grams) |
| --- | --- | --- | --- | --- |
| | | Weight (grams) | Wt. percent of Cl₄TACl* | |
| 1 | 13.1 | 16.2 | 96.2 | 15.6 |
| 2 | 5.65 | 8.4 | 98.7 | 8.3 |
| 3 | 2.63 | 3.52 | 100.9 | 3.52 |
| 4 | 1.28 | 1.42 | 96.6 | 1.37 |
| Total | 22.7 | | | 28.8 |

*Tetrachloroterephthalol chloride.

Example 6

Recovery of tetrachloroterephthaloyl chloride by cooling chlorinated solution.—A 231.4 g. aliquot from another chlorination was cooled in a special stirred 500 ml. cylindrical vessel having a fritted glass disc as a bottom, a draw-off line beneath it and protected from outside moisture. The vessel was then immersed in a Dewar flask. A small flow of dry nitrogen was passed upward through the M porosity filter. The aliquot was cooled to −41° C. (bath temperature) over a one-hour period with stirring. After holding at −40° to −41° C. for 75 minutes, the charge was pressure filtered into a suction flask using 3 p.s.i.g. nitgoen pressure on the vessel side and house vacuum on the receiver. Filtration was slow and in the 10 to 20 hours required the batch temperature rose from −41° to −16° C.

To remove the filter cake from the vessel a total of 600 ml. of carbon tetrachloride was used as a transfer solvent not as an extractive solvent. The recovered filter cake was completely dissolved in a 957.3 grams solution of carbon tetrachloride. A 195.9 gram aliquot was vacuum evaporated to remove the solvent and left a 11.4 gram solvent moist residue. Upon sublimation, 5.5 grams of chlorosulfonic acid was collected in the cold trap, 0.36 grams of solids remained as bottoms and 4.0 grams of sublimate was obtained. Analysis revealed the sublimate to be 90.8 wt. percent tetrachloroterephthaloyl chloride and 3.38% hexachlorobenzene. This represented a 62.5 mole percent yield of tetrachloroterephthaloyl chloride based on the terephthaloyl chloride charged to the chlorosulfonic acid solution for chlorination.

PREPARATION OF TETRACHLOROTEREPHTHALOYL CHLORIDE FROM CHLORINATION OF TEREPHTHALIC ACID IN CHLOROSULFONIC ACID SOLUTION

Example 7

The apparatus consisted of a 1-liter, 4-neck round bottomed, creased flask equipped with a fritted glass sparger, a stirrer, a reflux condenser, and a thermometer immersed in the liquid phase. The chlorine inlet line to the sparger was a Tygon tube which was shielded from light by an outer black rubber hose. To observe the gas flow the vent was passed from the reflux condenser to a Gilman trap containing concentrated sulfuric acid. The reaction flask was sealed from the light by aluminum foil and was heated by a mantle. The chlorination apparatus rested on a solution balance so that the increase in weight could be suitably monitored. The heating mantle was lowered on a jack and an ice bath was raised to control the temperature during the exothermic part of the reaction.

A 59.8 gram (.360 mole) charge of terephthalic acid was dissolved in 666.2 grams of chlorosulfonic acid. The solution was clear and was held at 48–51° C. for three hours. The next day 129.3 grams (1.62 moles) of sulfur trioxide ("Sulfan") was added followed by 1.13 grams of iodine. Addition of chlorine was started at 30° C. and was continued for 100 minutes. The temperature of the solution rose quickly after about 10 minutes to 85–95° C. and remained in this range. The solution began to gain weight minutes later and continued for the remainder of the 100 minutes, slowing to a negligble amount after 90 minutes. The apparent weight increase was approximately 91 grams. After the weight increases became negligible, indicating that the reaction was complete, the flask contents were divided among four separate tarred flasks for further processing.

One aliquot (241.9 grams) was extracted successively with one 300 and five 200 ml. portions of dry carbon tetrachloride. The combined extracts were evaporated under vacuum on a rotating flask evaporator to a maximum (final) temperature of 25° C. No heat was applied during evaporation. The residue contained both the desired tetrachloroterephthaloyl chloride and chlorosulfonic acid that had been dissolved in the carbon tetrachlorde. The chlorosulfonic acid was taken overhead under a vacuum of 11 to 2 mm. Hg in an oil bath at a temperature of 47½–99° C. leaving a residue of 23.9 g. A 5.0 gram sample of this residue was sublimed. The sublimation was carried out in a Kontes Sublimator (Catalog No. 85550) to which a ball joint and glass transfer line were added to make the system all glass through the cold receiver. The sublimation was done at 0.5 mm. Hg. Steam was passed through the condenser so that any residual solvent or chlorosulfonic acid would be carried over to the cold receiver. When solids began to appear on the walls (usually at 105 to 130° C. bath temperature) the steam was turned off and cooling water was passed through the condenser jacket. Tetrachloroterephthaloyl chloride sublimes readily and completely at a bath temperature of 175° C. The 30 mm. (inside diameter) by 75 mm. high pot can be charged with a maximum of about 12 grams of tetrachloroterephthaloyl chloride. Sublimate adheres well to the condenser walls and pot can be removed (gently) without having any sublimate fall back into the pot. The following results were observed:

| | Wt. g. | Anal. (wt. percent) | |
| --- | --- | --- | --- |
| | | Cl₄TACl | Hexachlorobenzene |
| Cold trap contents | 0.1 (probably ClSO₃H) | | |
| Sublimate: | | | |
| Top of deposit | 0.1 (trace of yellow) | 51.1 | 8.1 |
| Main deposit | 4.5 (dead white) | 98.0 | .48 |
| Bottoms | 0.2 | 0 | 0 |

The main sublimate had a melting point of 144–146° C.

To see if the chlorosulfonic acid solution that had been extracted contained any more tetrachloroterephthaloyl chloride it was further extracted with two 250 ml. portions of carbon tetrachloride. Each extract was analyzed in the same manner as the sublimate.

Weight of Cl₄TACl found by analysis, g.

Seventh extract _____ 1.03
Eighth extract _____ .76

Complete recovery of product had still not been realized. However, the product seen represents mole percent yields of tetrachloroterephthaloyl chloride on terephthalic acid charged as follows:

Mole percent

1st six extracts (main sublimate) _____ 68.2
Top portion of sublimate _____ .83
Seventh extraction _____ 3.3
Eighth extraction _____ 2.4

Total _____ 74.7

The extracting solvent is important in obtaining high yield. When another aliquot of Example 7 was extracted with carbon disulfide the yield realized of sublimed product was only 17.7 mole percent. This is quite unlike the yield realized when terephthaloyl chloride is the starting material rather than terephthalic acid.

With terephthaloyl chloride as the starting material there is no free sulfuric acid in the chlorosulfonic acid solvent and carbon disulfide is as efficient as carbon tetrachloride in recovering the product. Other suitable solvents include the fully halogenated alkanes, such as 1,2,2-trichloro-1,1,2-trifluoroethane which is even more stable than CCl₄ and is a good solvent for the diacid chloride.

What I claim is:

1. A process for the preparation of tetrachloroterephthaloyl chloride by chlorinating terephthaloyl chloride in a solution of chlorosulfonic acid in the presence of an iodine catalyst in the absence of light at a temperature in the range of 50–110° C., by reacting with chlorine and recovering the tetrachloroterephthaloyl chloride.

2. A process as set forth in claim 1 wherein sulfur trioxide is charged to the solution.

3. A process as set forth in claim 1 where the preferred temperature range of the reaction is 85–95° C.

4. A process for the preparation of tetrachloroterephthaloyl chloride by chlorination of terephthalic acid in a solution of chlorosulfonic acid in the presence of iodine as a catalyst where the reaction temperature may vary from 45–100° C. under a pressure of one atmosphere or greater, and recovering the tetrachloroterephthaloyl chloride.

5. A process for the preparation of tetrachloroterephthaloyl chloride as set forth in claim 4 wherein sulfur trioxide is charged to the reaction mixture.

6. A process for the preparation of tetrachloroterephthaloyl chloride as set forth in claim 4 wherein the reaction temperature is 85–95° C.

References Cited

Yakobsen: Zh Obshch. Khim., 34(9), 2953–8 (1964).
Profft: Arch. Pharm., 299(7), 577–88 (1966).

LORRAINE A. WEINBERGER, Primary Examiner

R. D. KELLY, Assistant Examiner